(12) United States Patent
Yamamoto

(10) Patent No.: US 9,309,066 B2
(45) Date of Patent: Apr. 12, 2016

(54) SHEET FEEDING DEVICE, AND IMAGE READING DEVICE AND IMAGE FORMING APPARATUS INCLUDING THIS

(71) Applicant: KYOCERA Document Solutions Inc., Osaka (JP)

(72) Inventor: Kiyonori Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/324,674

(22) Filed: Jul. 7, 2014

(65) Prior Publication Data

US 2015/0008638 A1    Jan. 8, 2015

(30) Foreign Application Priority Data

Jul. 8, 2013  (JP) ................................ 2013-142305

(51) Int. Cl.
*B65H 3/06* (2006.01)
*B65H 5/06* (2006.01)
(Continued)

(52) U.S. Cl.
CPC .............. *B65H 3/0669* (2013.01); *B65H 1/04* (2013.01); *B65H 3/0684* (2013.01); *B65H 5/06* (2013.01); *B65H 7/18* (2013.01); *F16H 1/06* (2013.01); *B65H 2403/42* (2013.01);
(Continued)

(58) Field of Classification Search
CPC .... B65H 3/06; B65H 3/0669; B65H 2403/42; B65H 2403/47; B65H 2403/721; F16H 1/10
USPC .......................... 271/113, 114, 116, 117, 118
See application file for complete search history.

(56) References Cited

U.S. PATENT DOCUMENTS 5,873,441 A * 2/1999 Tsujishita ........................ 192/46
6,213,458 B1 * 4/2001 Tamura et al. ............. 271/10.11
(Continued)

FOREIGN PATENT DOCUMENTS

EP        2733376 A2     5/2014
JP        H07-061619 A   3/1995
(Continued)

OTHER PUBLICATIONS

The extended European search report issued by the European Patent Office on Mar. 5, 2015, which corresponds to European Patent Application No. 14175518.1-1705 and is related to U.S. Appl. No. 14/324,674.

(Continued)

*Primary Examiner* — Patrick Cicchino
(74) *Attorney, Agent, or Firm* — Studebaker & Brackett PC

(57) ABSTRACT

In a sheet feeding device, a feeding roller is driven and rotated to feed a sheet in a conveying direction of a sheet conveying path and a drive transmission mechanism transmits rotation drive force generated in a driving portion to the feeding roller. In this mechanism, a drive input gear having an inner space is arranged on a rotation axis supporting the feeding roller rotatably so as to rotate by the rotation drive force. A drive transmission gear arranged between the feeding roller and drive input gear on the rotation axis rotates and becomes slide-movable along the rotation axis between a first position transmitting the rotation drive force to the feeding roller and a second position cutting off the transmission of the rotation drive force to the feeding roller by the rotation drive force from the drive input gear to transmit the rotation drive force to the feeding roller.

6 Claims, 11 Drawing Sheets

(51) Int. Cl.
*B65H 7/18* (2006.01)
*F16H 1/06* (2006.01)
*B65H 1/04* (2006.01)

(52) U.S. Cl.
CPC ...... *B65H 2403/47* (2013.01); *B65H 2403/721* (2013.01); *B65H 2405/3321* (2013.01); *B65H 2801/06* (2013.01); *B65H 2801/39* (2013.01)

(56) References Cited

U.S. PATENT DOCUMENTS

| | | | |
|---|---|---|---|
| 7,296,790 B2* | 11/2007 | Kim | 271/114 |
| 7,472,903 B2* | 1/2009 | Nakakita et al. | 271/114 |
| 8,109,500 B2* | 2/2012 | Shin et al. | 271/117 |
| 8,205,873 B2* | 6/2012 | Chung et al. | 271/118 |
| 8,276,904 B2* | 10/2012 | Ching-Tse | 271/10.04 |
| 8,496,240 B1* | 7/2013 | Tu et al. | 271/117 |
| 2007/0267805 A1* | 11/2007 | Lai et al. | 271/117 |
| 2008/0023903 A1* | 1/2008 | Liu et al. | 271/10.13 |
| 2009/0273137 A1* | 11/2009 | Chen et al. | 271/121 |
| 2011/0316218 A1* | 12/2011 | Ching-Tse | 271/10.11 |
| 2012/0070211 A1 | 3/2012 | Koiwai | |

FOREIGN PATENT DOCUMENTS

| | | |
|---|---|---|
| JP | 2008-150183 A | 7/2008 |
| JP | 2012-062186 A | 3/2012 |

OTHER PUBLICATIONS

An Office Action; "Notice of Reasons for Rejection," issued by the Japanese Patent Office on Nov. 4, 2015, which corresponds to Japanese Patent Application No. 2013-142305 and is related to U.S. Appl. No. 14/324,674.

* cited by examiner

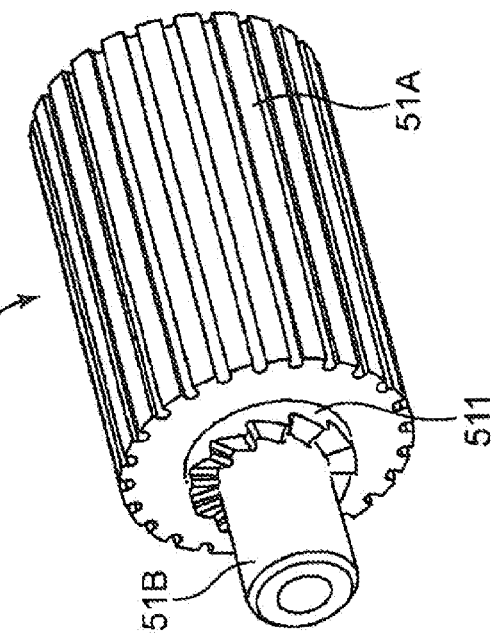
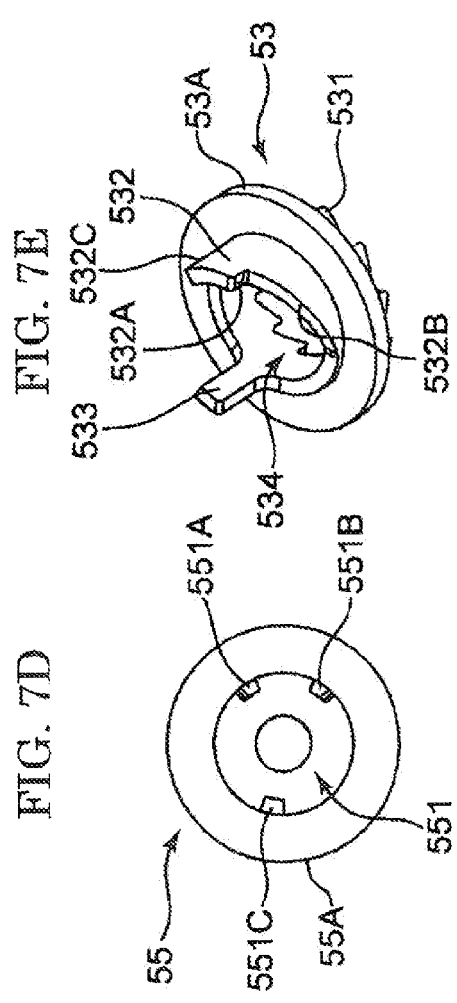
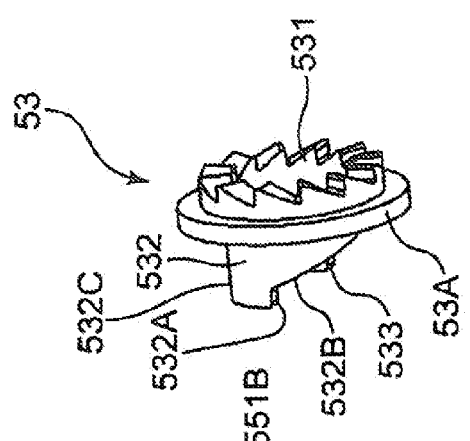
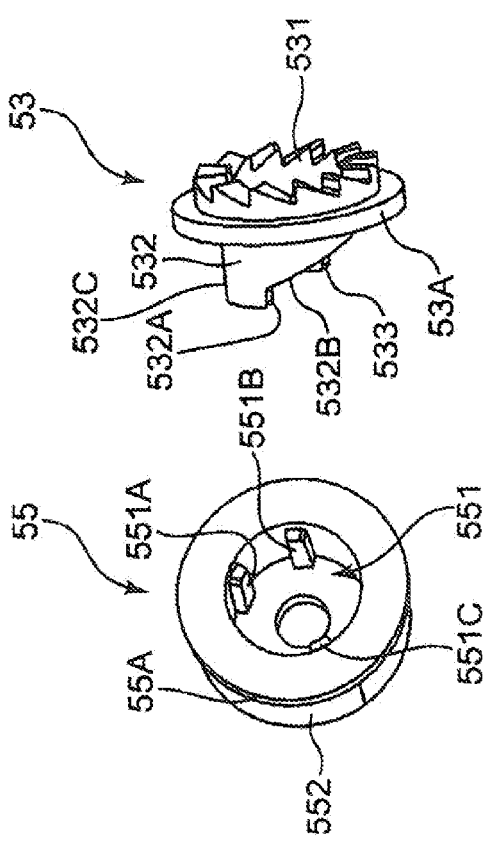

SHEET FEEDING DEVICE, AND IMAGE READING DEVICE AND IMAGE FORMING APPARATUS INCLUDING THIS

INCORPORATION BY REFERENCE

This application is based on and claims the benefit of priority from Japanese Patent application No. 2013-142305 filed on Jul. 8, 2013, the entire contents of which are incorporated herein by reference.

BACKGROUND

The present disclosure relates to a sheet feeding device feeding a sheet, and an image reading device and an image forming apparatus including this sheet feeding device.

Conventionally, in a sheet feeding device (a sheet feeder) feeding a sheet, a one-way clutch attached to a sheet feeding roller to transmit power in one way is known. The power used for rotation is inputted from the one-way clutch to the sheet feeding roller, and then, the sheet feeding roller feeds the sheet.

The one-way clutch includes a drive inputting portion, a drive transmitting portion and a drive outputting portion. The drive transmitting portion is arranged between the drive inputting portion and drive outputting portion. The drive outputting portion corresponds to the sheet feeding roller. When a protrusion protruded toward the drive transmitting portion from the drive inputting portion is engaged with a notch formed in the drive transmitting portion, the power is transmitted from the drive inputting portion to the drive transmitting portion.

However, since the protrusion and notch respectively formed in the outer peripheral surfaces of the drive inputting portion and drive transmitting portion are engaged with each other, a length in an axial direction of a drive transmission mechanism transmitting the power to the sheet feeding roller is increased. As a result, in the sheet feeding device, there is a problem that a space occupied by a sheet feeding portion is increased.

SUMMARY

In accordance with one aspect of the present disclosure, a sheet feeding device includes a tray portion, a sheet conveying path, a feeding roller, a driving portion and a drive transmission mechanism. On the tray portion, a sheet is placed. The sheet conveying path is extended from the tray portion to convey the sheet in a predetermined conveying direction. The feeding roller is driven and rotated to feed the sheet in the conveying direction. The driving portion generates rotation drive force used for driving and rotating the feeding roller. The drive transmission mechanism transmits the rotation drive force to the feeding roller. The drive transmission mechanism includes a rotation axis, a drive input gear and a drive transmission gear. The rotation axis supports the feeding roller rotatably. The drive input gear is formed in a cylinder like shape having an inner space inside and arranged on the rotation axis so as to rotate around the rotation axis by input of the rotation drive force of the driving portion. The drive transmission gear is arranged between the feeding roller and drive input gear on the rotation axis so as to rotate around the rotation axis and to become capable of slide-moving in an axial direction of the rotation axis between a first position where the rotation drive force is transmitted to the feeding roller and a second position where the transmission of the rotation drive force to the feeding roller is cut off by transmission of the rotation drive force from the drive input gear, and then, to transmit the rotation drive force to the feeding roller. The drive input gear includes a first engaging portion in the inner space. The drive transmission gear includes a second engaging portion connectable to the first engaging portion. The second engaging portion is inserted into the inner space at the second position.

In accordance with another aspect of the present disclosure, an image reading device includes the above-mentioned sheet feeding device and a reading portion. The sheet feeding device conveys the sheet as a document. The reading portion is arranged so as to face to the sheet conveying path to read an image of the document.

In accordance with another aspect of the present disclosure, an image forming apparatus includes the above-mentioned sheet feeding device and an image forming portion forming an image on the sheet.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIGS. 7A, 7B, 7C, 7D and 7E are exploded perspective views showing a pickup roller and a drive transmission mechanism according to the embodiment of the present disclosure.

DETAILED DESCRIPTION

In the following, with reference to the drawings, an embodiment of the present disclosure will be described. FIG.

Figure 2:
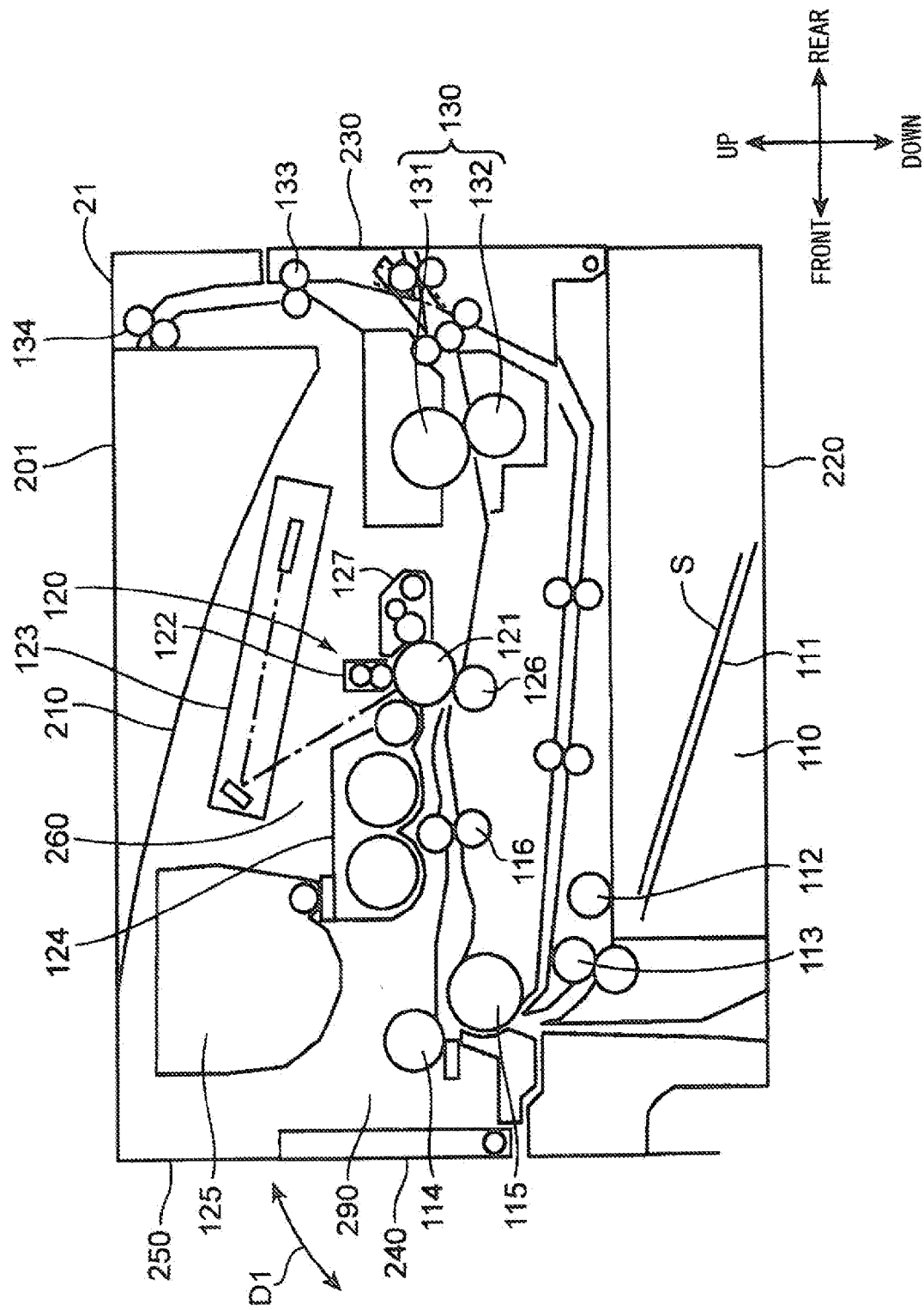
FIG. 2 is an internal sectional view showing a lower housing of the image forming apparatus according to the embodiment of the present disclosure.
Figure 3:
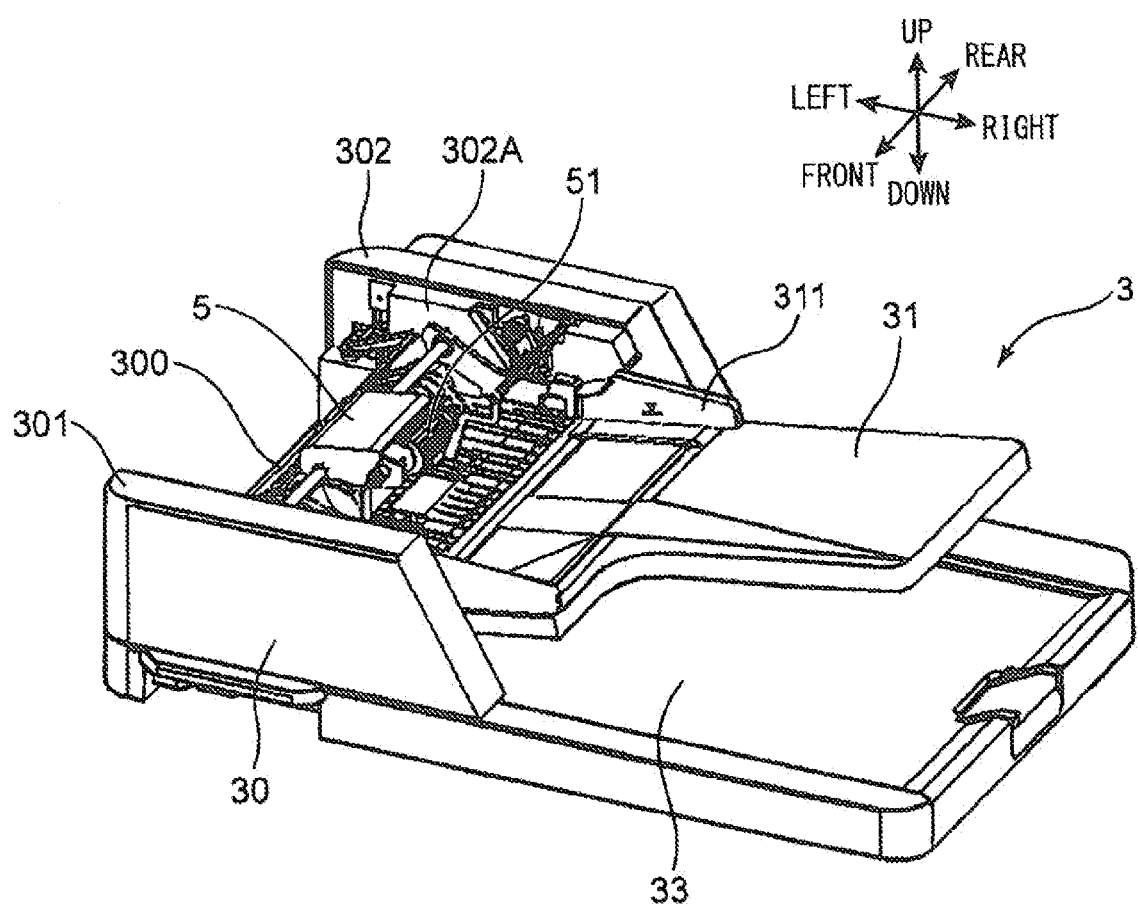
FIG. 3 is a perspective view showing an automatic document feeding device according to the embodiment of the present disclosure.

1 is a perspective view showing an external appearance of an image forming apparatus 1 including an automatic document feeding device 3 according to the embodiment of the present disclosure. FIG. 2 is a sectional view showing an internal structure of a lower housing 21 of the image forming apparatus 1. FIG. 3 is a perspective view showing the automatic document feeding device 3. Incidentally, FIG. 3 shows the automatic document feeding device 3 in a state that an upper cover unit 32U mentioned below is detached.

The image forming apparatus 1 includes an apparatus main body 2 and the automatic document feeding device 3. The apparatus main body 2 has a housing structure in a roughly rectangular parallelpiped shape and provides an in-body space. The automatic document feeding device 3 is arranged on a top face of the apparatus main body 2.

In the apparatus main body 2, image forming process to a sheet S is performed. The apparatus main body 2 includes the lower housing 21 in a roughly rectangular parallelpiped shape, an upper housing 22 in a roughly rectangular parallelpiped shape and a connecting housing 23. The upper housing 22 is arranged above the lower housing 21. The connecting housing 23 connects the lower housing 21 and upper housing 22. In the lower housing 21, various equipment used for the image forming are installed. In the upper housing 22, various equipment used for optically reading a document image are installed. The in-body space surrounded by the lower housing 21, upper housing 22 and connecting housing 23 is an in-body sheet ejecting portion 24 capable of storing the sheet S after the image forming. The connecting housing 23 connects the lower housing 21 and upper housing 22 at left and right sides and a rear side of the apparatus main body 2.

The in-body space utilized as the in-body sheet ejecting portion 24 is opened to the outside in a front face of the apparatus main body 2. A user can insert his/her hand in the opened part to take out the sheet S after the image forming from the in-body sheet ejecting portion 24.

In a front face of the upper housing 22, an operation panel unit 25 is arranged so as to be protruded. The operation panel unit 25 includes operation keys 251 and a liquid crystal display (LCD) touch panel 252 having numeric keys, a start key and others to receive inputs of various operation instructions from the user. The user can input the number of the sheets S to be printed, print density and others by using the operation panel unit 25.

Next, with reference to FIG. 2, the internal structure of the lower housing 21 will be described. The lower housing 21 is defined a plurality of outside walls. The lower housing 21 has a top wall 201 providing a top face of the lower housing 21, a bottom wall 220 providing a bottom face of the lower housing 21, a back face wall 230 vertically arranged between the top wall 201 and bottom wall 220 and a front wall 250 vertically arranged at an opposite side to the back face wall 230. The lower housing 21 has a main body internal space 260 in which the various equipment are installed.

In the center of the top wall 201, an ejected sheet portion 210 is arranged. The ejected sheet portion 210 is composed of an inclined face downwardly inclined from the front side to the rear side of the top wall 201. On the ejected sheet portion 210, the sheet S having the image formed in an image forming portion 120 mentioned below is ejected. In the center in upward and downward directions of the front wall 250, a manual bypass tray 240 is arranged. The manual bypass tray 240 is configured turnable upward and downward around a lower end as a pivot (refer to an arrow D1 in FIG. 2). When an upper end side of the manual bypass tray 240 is turned downward, an opening part 290 formed in the lower housing 21 is opened. The opening part 290 communicates with the main body internal space 260 of the lower housing 21. A user can access to various equipment installed in the main body internal space 260 of the lower housing 21 through the opening part 290. When the manual bypass tray 240 is turned upward, the opening part 290 is closed. As a result, unnecessary access in the main body internal space 260 by the user is prevented.

The image forming apparatus 1 includes a cartridge 110, a pickup roller 112, a first sheet feeding roller 113, a second sheet feeding roller 114, a conveying roller 115, a pair of resist rollers (paper stop rollers) 116 and the image forming portion 120.

Inside the cartridge 110, the sheet S is stored. The cartridge 110 includes a lift board 111 supporting the sheet S. The lift board 111 is inclined so as to push up a leading edge of the sheet S.

The pickup roller 112 is arranged above the leading edge of the sheet S pushed up by the lift board 111. When the pickup roller 112 is rotated, the sheet S is withdrawn from the cartridge 110.

The first sheet feeding roller 113 is arranged at a downstream side from the pickup roller 112. The first sheet feeding roller 113 sends out the sheet S to a further downstream side. The second sheet feeding roller 114 is arranged near the pivot of the manual bypass tray 240. The second sheet feeding roller 114 draws the sheet S on the manual bypass tray 240 into the lower housing 21. The user can selectively use the sheet S stored in the cartridge 110 and the sheet S located on the manual bypass tray 240.

The conveying roller 115 is arranged at a downstream side from the first sheet feeding roller 113 and second sheet feeding roller 114. The conveying roller 115 conveys the sheet S sent out by the first sheet feeding roller 113 and second sheet feeding roller 114 to a further downstream side.

The pair of resist rollers 116 provide a position in conveying direction of the sheet. Thereby, a position of the image formed on the sheet S is adjusted. The pair of resist rollers 116 feed the sheet S to the image forming portion 120 in accordance with timing of the image forming in the image forming portion 120.

The image forming portion 120 is arranged in the main body internal space 260. The image forming portion 120 forms the image on the sheet. The image forming portion 120 includes a photosensitive drum 121, a charger 122, an exposure device 123, a development device 124, a toner container 125, a transferring roller 126 and a cleaning device 127.

The photosensitive drum 121 has a cylindrical body like shape. Around a circumference face of the photosensitive drum 121, an electrostatic latent image is formed, and then, the photosensitive drum 121 carries a toner image according to the electrostatic latent image.

To the charger 122, a given voltage is applied, and then, the charger 122 electrically charges the circumference face of the photosensitive drum 121 roughly even.

The exposure device 123 emits a laser light to the circumference face of the photosensitive drum 121 electrically charged by the charger 122. The laser light is emitted in accordance with image data outputted from an external device (not shown), such as a personal computer, connected to the image forming apparatus 1 communicatably. As a result, on the circumference face of the photosensitive drum 121, the electrostatic latent image corresponding to the image data is formed.

The development device 124 supplies a toner to the circumference face of the photosensitive drum 121 having the formed electrostatic latent image. The toner container 125 supplies the toner to the development device 124. The toner container 125 supplies the toner to the development device 124 sequentially or as necessary. When the development device 124 supplies the toner to the photosensitive drum 121, the electrostatic latent image formed on the circumference face of the photosensitive drum 121 is developed (visualized). As a result, the toner image is formed on the circumference face of the photosensitive drum 121.

The transferring roller 126 is rotatably arranged so as to come into contact with the circumference face of the photosensitive drum 121. When the sheet S conveyed from the pair of resist rollers 116 passes through between the photosensitive drum 121 and transferring roller 126, the toner image formed on the circumference face of the photosensitive drum 121 is transferred on the sheet S.

The cleaning device 127 removes the toner remained on the circumference face of the photosensitive drum 121 after the toner image is transferred on the sheet S. The circumference face of the photosensitive drum 121 cleaned by the cleaning device 127 passes through below the charger 122 again to be electrically charged even. After that, the above-mentioned toner image forming is carried out anew.

The image forming apparatus 1 further includes a fixing device 130 fixing the toner image on the sheet S at a downstream side in the conveying direction from the image forming portion 120. The fixing device 130 includes a heating roller 131 and a pressuring roller 132. The heating roller 131 dissolves the toner on the sheet S. The pressuring roller 132 makes the sheet S closely contact with the heating roller 131. When the sheet S passes through between the heating roller 131 and a pressuring roller 132, the toner image is fixed on the sheet S.

The image forming apparatus 1 further includes a pair of conveying rollers 133 arranged at a downstream side from the fixing device 130 and a pair of ejecting rollers 134 arranged at a downstream side from the pair of conveying rollers 133. The sheet S is conveyed upward by the pair of the conveying rollers 133 and eventually ejected from the lower housing 21 by the pair of the ejecting rollers 134. The sheet S ejected from the lower housing 21 is piled up on the ejected sheet portion 210.

The automatic document feeding device 3 is turnably arranged on a top face and at a rear side of the apparatus main body 2. In FIG. 2, the automatic document feeding device 3 is omitted. The automatic document feeding device 3 automatically feeds a document sheet P to be copied to a predetermined document reading position in the upper housing 22 of the apparatus main body 2. On the other hand, when the user manually locates the document sheet P on the predetermined document reading position, the user opens the automatic document feeding device 3 upward.

Figure 1:
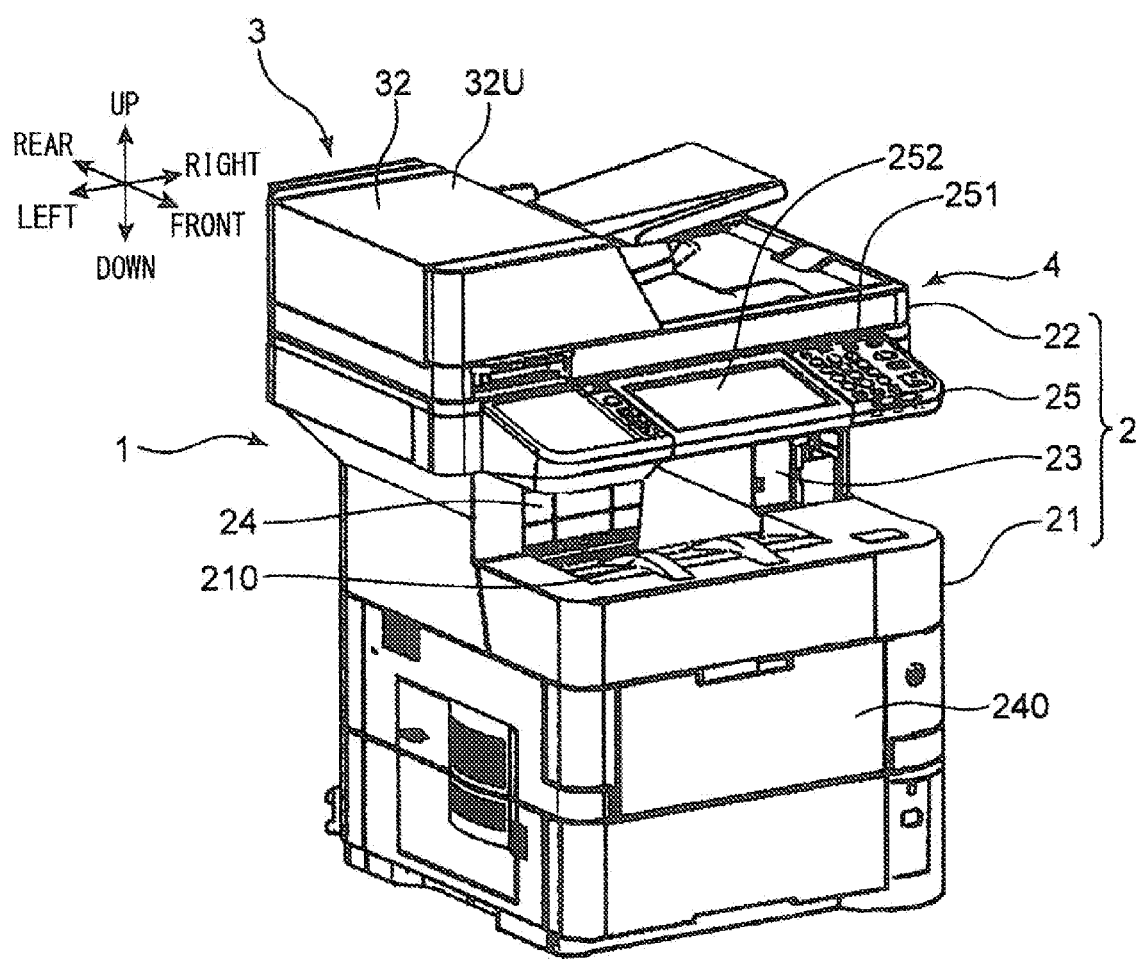
FIG. 1 is a perspective view showing an image forming apparatus according to an embodiment of the present disclosure.

With reference to FIGS. 1 and 3, the automatic document feeding device 3 (a sheet feeding device) includes a main body housing 30, a feeding document sheet tray 31, a document conveying portion 32 and an ejected document sheet tray 33. The main body housing 30 is a case adapted for installing various equipment provided in the automatic document feeding device 3. The main body housing 30 has a front wall portion 301 and a rear wall portion 302 protruded upward at the left side adapted for installing the document conveying portion 32. The main body housing 30 also has a roughly flat low layer part at the right side.

The feeding document sheet tray 31 (a tray portion) is a tray on which the document sheet P (a sheet) to be fed to the document reading position is placed. The feeding document sheet tray 31 is attached to the main body housing 30 so as to extend from the document conveying portion 32 of the main body housing 30 to the right side. The feeding document sheet tray 31 includes a pair of cursors 311 used for aligning width of the placed document sheet P.

The document conveying portion 32 includes a conveying path and a conveying mechanism conveying the document sheet P on the feeding document sheet tray 31 to the ejected document sheet tray 33 via the document reading position. The document conveying portion 32 includes the upper cover unit 32U fitted to an opening between the front wall portion 301 and rear wall portion 302 of the main body housing 30. Moreover, a sheet conveying path 300 is arranged to extend from the feeding document sheet tray 31 to the ejected document sheet tray 33 via the document reading position (refer to FIGS. 3 and 4). The sheet conveying path 300 is a conveying path extended from the feeding document sheet tray 31 to convey the document sheet P in a predetermined conveying direction (refer to an arrow DP in FIG. 4).

The ejected document sheet tray 33 is a tray on which the document sheet P is ejected after a document image is optically read. A top face of the low layer part at the right side of the main body housing 30 is the ejected document sheet tray 33.

As mentioned above, in the upper housing 22, a reading portion (not shown) reading the image of the document sheet P is arranged at the document reading position to face to the sheet conveying path 300. The automatic document feeding device 3 and reading portion composes the image reading device 4 (refer to FIG. 1) of the embodiment.

Figure 4:
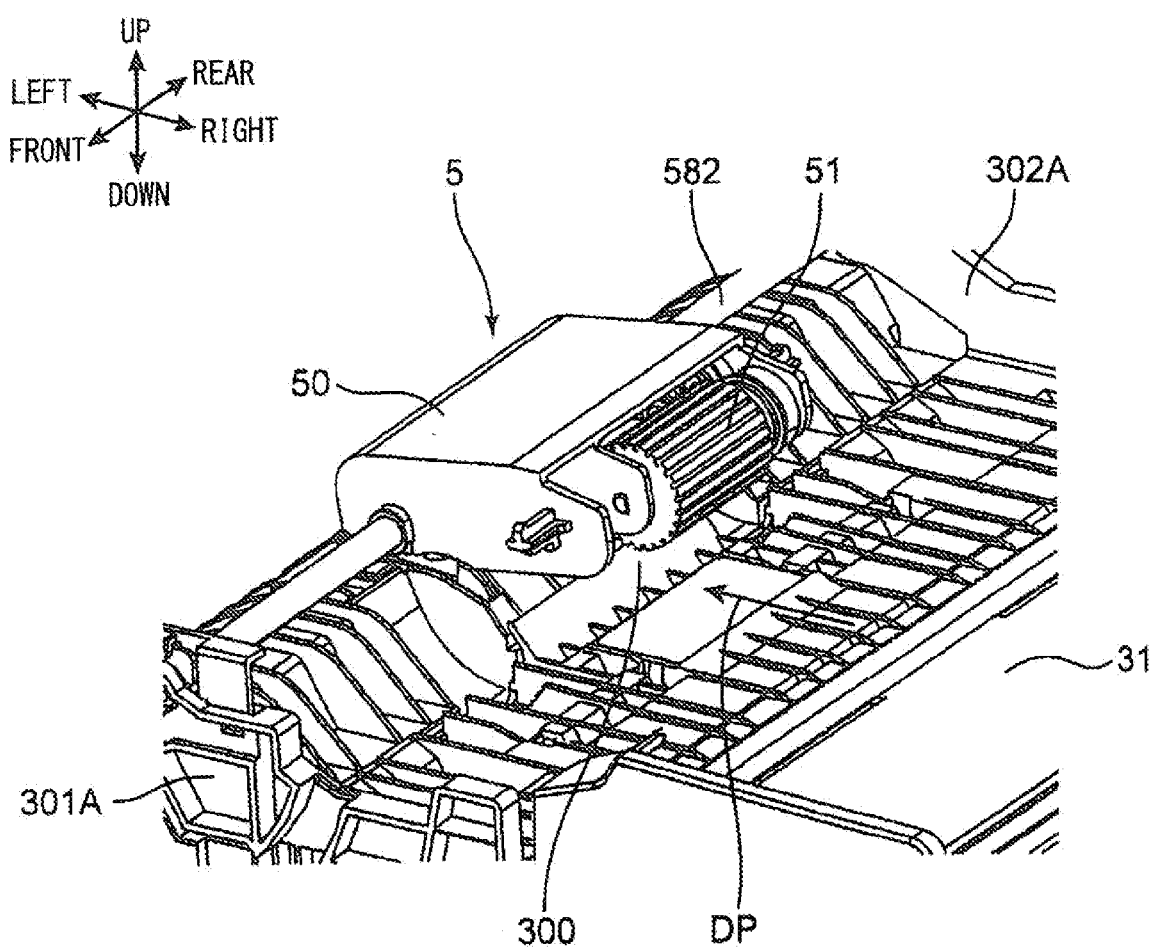
FIG. 4 is a perspective view showing the periphery of a document feeding unit in the automatic document feeding device according to the embodiment of the present disclosure.
Figure 5:
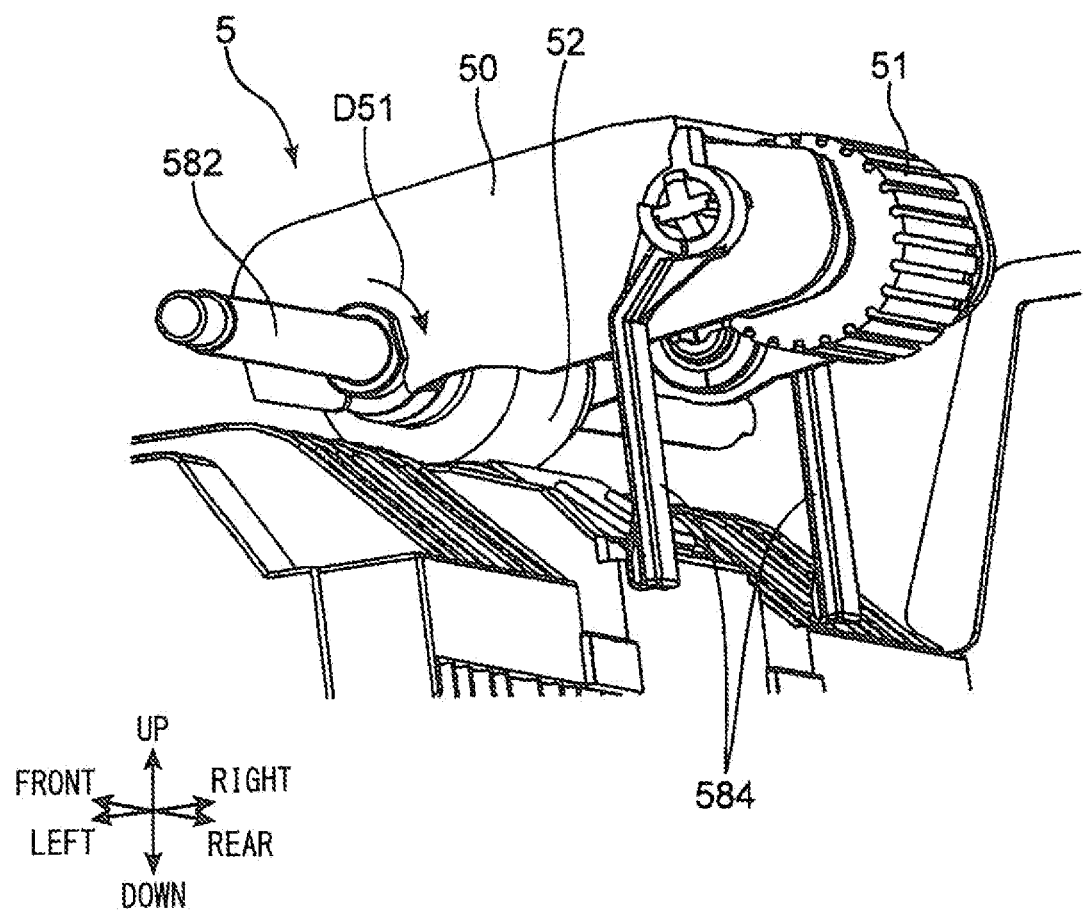
FIG. 5 is an enlarged perspective view showing the periphery of the document feeding unit in the automatic document feeding device according to the embodiment of the present disclosure.
Figure 6:
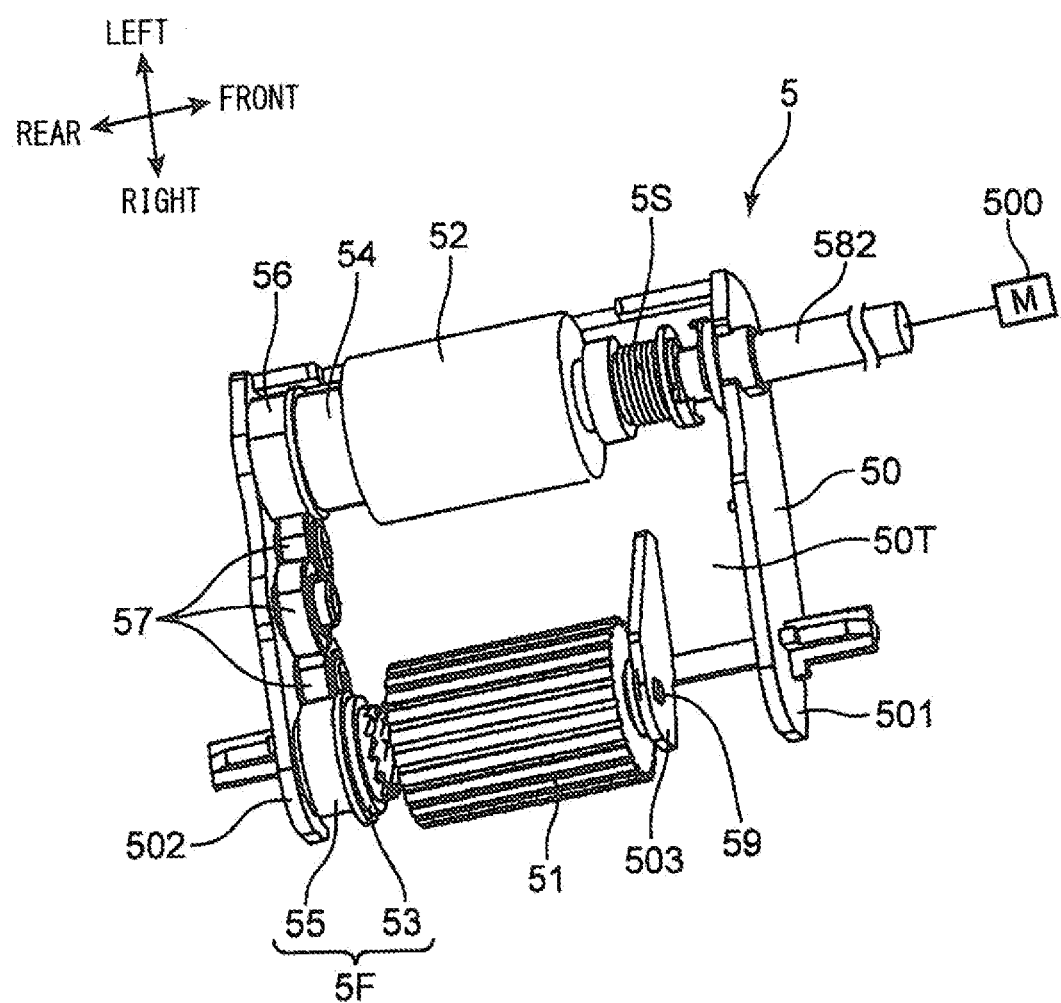
FIG. 6 is a perspective view showing the document feeding unit according to the embodiment of the present disclosure.
Figure 8:
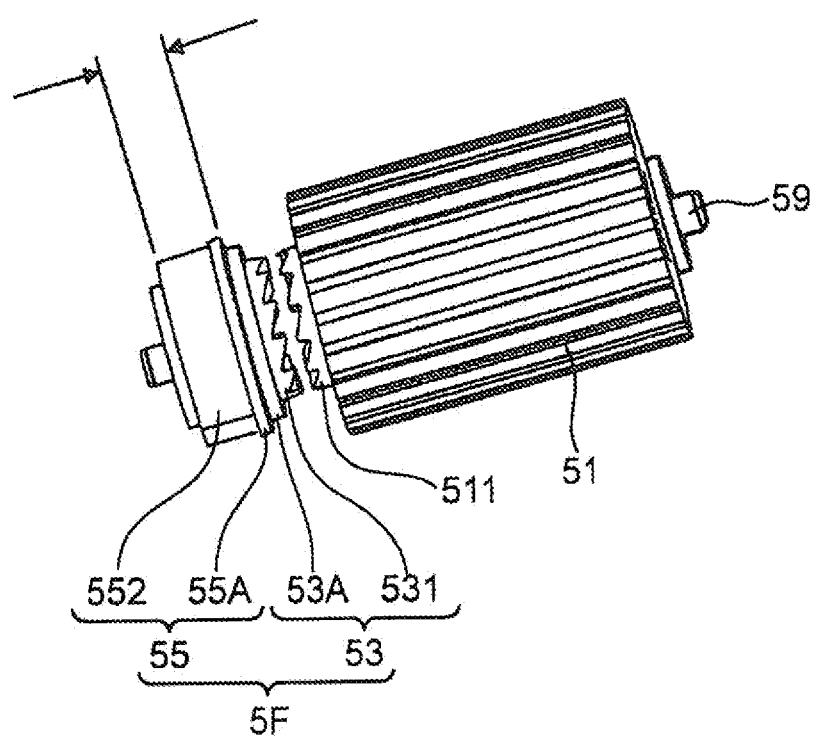
FIG. 8 is a perspective view showing the pickup roller and drive transmission mechanism according to the embodiment of the present disclosure.

Next, the sheet feeding device will be described. With reference to FIGS. 4-8 in addition to FIG. 3, internal structure of the automatic document feeding device 3 will be described in detail. FIG. 4 is a perspective view showing the periphery of a document feeding unit 5 in the automatic document feeding device 3 according to the embodiment. FIG. 5 is an enlarged perspective view showing the periphery of the document feeding unit 5. FIG. 6 is a perspective view showing the document feeding unit 5. FIGS. 7A, 7B, 7C, 7D and 7E are exploded perspective views showing a pickup roller 51 and a drive transmission mechanism 5F of the document feeding unit 5. FIG. 8 is a perspective view showing the pickup roller 51 and drive transmission mechanism 5F.

With reference to FIGS. 4 and 5, the automatic document feeding device 3 includes the document feeding unit 5. The document feeding unit 5 is arranged inside the document conveying portion 32. The document feeding unit 5 is positioned above the sheet conveying path 300 and assembled below the upper cover unit 32U.

The document feeding unit 5 includes a holder 50 supporting various components, a pickup roller 51 (a feeding roller), a second drive shaft 59 (refer to FIG. 8) (a rotation axis), a document sheet feeding roller 52 and a first drive shaft 582. The document feeding unit 5 also includes a motor 500 (a driving portion), stopper pieces 584 regulating a leading end in a sheet feeding direction of the document sheet and a swinging mechanism (not shown) swinging the holder 50.

The holder 50 supports various components of the document feeding unit 5. The holder 50 is supported by the first drive shaft 582 mentioned below so as to be turnable around the first drive shaft 582. With reference to FIG. 6, the holder 50 has a top plate 50T, a front plate 501, a rear plate 502 and an intermediate plate 503. The top plate 50T is a rectangular plate like member extending in forward and backward directions and in left and right directions. The front plate 501, rear plate 502 and intermediate plate 503 are wall members erected on the top plate 50T.

The pickup roller 51 is arranged at an entry side of the sheet conveying path 300 so as to face to the feeding document sheet tray 31. The pickup roller 51 is rotatably supported by the second drive shaft 59 as the rotation axis (refer to FIG. 8). The pickup roller 51 has a rotation face 51A coming into contact with the document sheet P. To the pickup roller 51, rotation drive force used for rotating around the second drive shaft 59 is applied. The pickup roller 51 send out (feeds) the document sheet P placed on the document sheet feeding tray 31 in the predetermined conveying direction in the sheet conveying path 300. By the turn of the holder 50, a position of the pickup roller 51 is switched between a sheet feeding position and a withdrawal position. When the pickup roller 51 is positioned at the sheet feeding position, the rotation face 51A comes into contact with a top face of the document sheet P on the document sheet feeding tray 31. When the pickup roller 51 is positioned at the withdrawal position, the rotation face 51A separates upward from the top face of the document sheet P.

The second drive shaft 59 supports the pickup roller 51 rotatably. The second drive shaft 59 is the rotation axis in the rotation of the pickup roller 51 and is supported by the intermediate plate 503 and rear plate 502 of the holder 50 as shown in FIG. 6. The second drive shaft 59 is an axis portion extending between the intermediate plate 503 and rear plate 502 and the extending state is latent in FIG. 6. The second drive shaft 59 supports rotatably a first input gear 55 and a first transmission gear 53 mentioned below. Therefore, the second drive shaft 59 is fixed to the holder 50 so as to penetrate the first input gear 55, first transmission gear 53 and pickup roller 51.

The document sheet feeding roller 52 is arranged at a downstream side in a sheet conveying direction from the pickup roller 51 at a predetermined interval. The document sheet feeding roller 52 is rotatably supported by the first drive shaft 582 as the rotation axis. The document sheet feeding roller 52 further conveys the document sheet P sent out from the pickup roller 51 to a downstream side in the sheet conveying path 300 one by one.

The first drive shaft 582 is the rotation axis of the document sheet feeding roller 52 and is rotatably supported by a pair of side walls 301A and 302A (refer to FIGS. 3 and 4) arranged below the upper cover unit 32U and inside the front wall portion 301 and rear wall portion 302. Moreover, the first drive shaft 582 penetrates the front plate 501 and rear plate 502 of the holder 50 and supports the holder 50 rotatably. The first drive shaft 582 also supports rotatably the second input gear 56 mentioned below.

The motor 500 (refer to FIG. 6) generates the rotation drive force used for driving and rotating the pickup roller 51 and document sheet feeding roller 52. The motor 500 is connected to the first drive shaft 582. When the first drive shaft 582 is rotated, the rotation drive force is transmitted to the document sheet feeding roller 52. In addition, the rotation drive force is transmitted to the pickup roller 51 via idle gears 57 mentioned below.

When the pickup roller 51 is positioned at the withdrawal position, the stopper pieces 584 (refer to FIG. 5) are protruded to a downstream end of the document sheet feeding tray 31, thereby regulating the leading end in the sheet feeding direction of the document sheet P. On the other hand, when the pickup roller 51 is positioned at the sheet feeding position due to the swing of the holder 50, the stopper pieces 584 is interlocked with downward movement of a right end (refer to FIG. 5) of the holder 50 so that a lower end of the stopper pieces 584 is pushed up, thereby releasing the regulation of the leading end in the sheet feeding direction of the document sheet.

The swinging mechanism includes a torsion coil spring 5S (not shown) connecting the holder 50 and first drive shaft 582. The torsion coil spring 5S has a coil portion inserted by predetermined holding force into a boss (not shown) formed in the first drive shaft 582 in a body and has a positive direction engaging portion and a negative direction engaging portion (both not shown) to the holder 50. The torsion coil spring 5S is a member connecting the holder 50 and first drive shaft 582 in a spring clutch like situation. The torsion coil spring 5S transmits the rotation force of the first drive shaft 582 to the holder 50 in a condition that the swing of the holder 50 is not regulated, while does not transmit the rotation force of the first drive shaft 582 to the holder 50 in another condition that the swing of the holder 50 is regulated. Incidentally, instead of the torsion coil spring 5S, a torque limiter may be used.

In a case where the rotation drive force in a positive direction is applied to the first drive shaft 582, the torsion coil spring 5S is integrally rotated with the first drive shaft 582 due to the holding force and the positive direction engaging portion transmits the rotation force to the holder 50. As a result, the holder 50 is turned in a clockwise direction (refer to an arrow D51 in FIG. 5) around an axial center of the first drive shaft 582. The pickup roller 51 is moved to the sheet feeding position coming into contact with the top face of the document sheet P placed on the document sheet feeding tray 31. After the pickup roller 51 is abutted in a stop state to the document sheet feeding tray 31, a winding force of the torsion coil spring 5S to the first drive shaft 582 is loosened and the first drive shaft 582 is raced to the torsion coil spring 5S. Thereby, the rotation force of the first drive shaft 582 after the movement to the sheet feeding position is not transmitted to the holder 50.

In another case where the rotation drive force in a negative direction is applied to the first drive shaft 582, the similar operation as the above-mentioned case is performed. In the other case, the negative direction engaging portion is engaged with the holder 50, and then, the holder 50 is turned in the counter-clockwise direction around the axial center of the first drive shaft 582. Thereby, the pickup roller 51 is moved to the withdrawal position separated from the top face of the document sheet P upward.

Further, the document feeding unit 5 includes a one-way clutch 54, the second input gear 56, idle gears 57 and the drive transmission mechanism 5F (refer to FIG. 6). These members have a function transmitting the rotation drive force to the pickup roller 51.

The one-way clutch 54 is arranged adjacent to the document sheet feeding roller 52 on the first drive shaft 582. The second input gear 56 is arranged adjacent to the one-way clutch 54 at an opposite side to the document sheet feeding roller 52 and rotatably supported by the first drive shaft 582. The one-way clutch 54 and second input gear 56 are arranged between the document sheet feeding roller 52 and rear plate 502 of the holder 50. The one-way clutch 54 has a function capable of rotating freely the document sheet feeding roller 52 in a predetermined direction when the rotation drive force of the motor 500 is cut off, as mentioned below.

The idle gears 57 are free-rotatably supported by axes (not shown) protruded on the inside of the rear plate 502 of the holder 50. The idle gears 57 are three gears arranged adjacent to each other. The idle gears 57 have spur like shapes on peripheral surfaces, respectively. The idle gears 57 mesh with the second input gear 56 and first input gear 55 to transmit the rotation drive force from the second input gear 56 to the first input gear 55. The rotation drive force transmitted from the motor 500 to the first drive shaft 582 is transmitted to the first input gear 55 of the drive transmission mechanism 5F via the second input gear 56 and idle gears 57.

The drive transmission mechanism 5F includes the first input gear 55 (a drive input gear) and first transmission gear 53 (a drive transmission gear) in addition to the above-mentioned second drive shaft 59.

The first input gear 55 is arranged adjacent to the first transmission gear 53 at an opposite side to the pickup roller 51 and rotatably supported by the second drive shaft 59. In other words, the first input gear 55 is arranged coaxial with the pickup roller 51. When the rotation drive force of the motor 500 is inputted to the first input gear 55, the first input gear 55 is rotated around the second drive shaft 59. The first input gear 55 transmits the rotation drive force transmitted from the idle gears 57 to the first transmission gear 53. With reference to FIGS. 7A and 7D, the first input gear 55 is formed in a cylinder like shape and has a hollow cylindrical space 551 (an inner space) inside. The first input gear 55 further has a flange portion 55A, a gear portion 552, an engaging protrusion 551A (a first engaging portion), a first supporting protrusion 551B (a protruded portion) and a second supporting protrusion 551C (a protruded portion).

The flange portion 55A is a flange portion arranged at the first transmission gear 53's side in the first input gear 55. When the first input gear 55 and first transmission gear 53 are installed into the document feeding unit 5, the flange portion 55A is arranged so as to face to a thin wall portion 53A of the first transmission gear 53 mentioned below. The gear portion 552 is arranged at the rear plate 502's side in the outer peripheral surface of the first input gear 55. On the peripheral surface of the gear portion 552, a spur gear (not shown) is arranged. The spur gear is meshed with a spur gear (not shown) of the idle gears 57. The cylindrical space 551 is a cylinder-like formed inner space provided inside the gear portion 552 and flange portion 55A. As shown in FIG. 7A, the cylindrical space 551 is provided so as to open at the first transmission gear 53's side. Into the cylindrical space 551, a transmission projection portion 532 and a roller axis portion 51B mentioned below are inserted.

The engaging protrusion 551A is protruded inwardly in a radial direction from the inner peripheral surface in the first input gear 55. As shown in FIGS. 7A and 7D, the engaging protrusion 551A is protruded from the inner peripheral surface of the first input gear 55 so as to insert into the cylindrical space 551. The engaging protrusion 551A is a roughly rectangular parallelpiped protruded portion having a predetermined width in a peripheral direction of the first input gear 55 and extending in an axial direction of the first input gear 55. The engaging protrusion 551A is engaged with the transmission projection portion 532 of the first transmission gear 53 mentioned below.

The first supporting protrusion 551B and second supporting protrusion 551C are arranged at an interval from the engaging protrusion 551A in the peripheral direction in rotation of the first input gear 55. The first supporting protrusion 551B and second supporting protrusion 551C are protruded inwardly in the radial direction from the inner peripheral surface to the inside in the first input gear 55. As shown in FIG. 7D, the engaging protrusion 551A, first supporting protrusion 551B and second supporting protrusion 551C are arranged so as to be positioned at the vertex of an isosceles triangle formed around a rotation axis of the first input gear 55. Between the engaging protrusion 551A and second supporting protrusion 551C, the transmission projection portion 532 of the first transmission gear 53 mentioned below is inserted. The first supporting protrusion 551B and second supporting protrusion 551C are also protruded from the inner peripheral surface of the first input gear 55 so as to insert into the cylindrical space 551. The first supporting protrusion 551B and second supporting protrusion 551C are moreover roughly rectangular parallelpiped protruded portions having predetermined widths in the peripheral direction of the first input gear 55 and extending in an axial direction of the first input gear 55. The engaging protrusion 551A, first supporting protrusion 551B and second supporting protrusion 551C are supported from the inside in the radial direction by the roller axis portion 51B of the pickup roller 51 mentioned below.

The first transmission gear 53 is arranged adjacent to the pickup roller 51 and rotatably supported by the second drive shaft 59. The first transmission gear 53 is arranged coaxial with the pickup roller 51 between the pickup roller 51 and first input gear 55. The first transmission gear 53 has a function transmitting the rotation drive force to the pickup roller 51.

The first transmission gear 53 is rotated around the second drive shaft 59, when the rotation drive force is transmitted from the first input gear 55 to the first transmission gear 53. The first transmission gear 53 is configured capable of slide-moving in the axial direction in a pivotally supported state to the second drive shaft 59. The first transmission gear 53 is slide-moved between a first position (refer to FIG. 10) and a second position (refer to FIG. 9). The first position is a position at the pickup roller 51's side in the axial direction, in which, the first transmission gear 53 transmits the rotation drive force to the pickup roller 51. The second position is a position at the first input gear 55's side in the axial direction, in which, the transmission of the rotation drive force from the first transmission gear 53 to the pickup roller 51 is cut off. The slide-movement of the first transmission gear 53 between the first position and second position actualizes switching of the transmission of the rotation drive force from the first transmission gear 53 to the pickup roller 51. With reference to FIGS. 7B and 7E, the first transmission gear 53 has the thin wall portion 53A, transmission projection portion 532 (a second engaging portion), a facing projection portion 533 and a transmitting gear portion 531. Inside the first transmission gear 53, a hollow insertion space 534 (refer to FIG. 7E) is provided. Into the insertion space 534, the roller axis portion 51B of the pickup roller 51 is inserted.

The thin wall portion 53A is positioned at the center in the axial direction of the first transmission gear 53. The thin wall portion 53A has a maximum diameter in the first transmission gear 53. The thin wall portion 53A is formed in a thin ring like shape.

The transmission projection portion 532 is projected in the axial direction from the thin wall portion 53A. The transmission projection portion 532 is also projected at the first input gear 55's side. The transmission projection portion 532 is inserted into the cylindrical space 551 of the first input gear 55 and engaged with the engaging protrusion 551A. The engaging protrusion 551A and transmission projection portion 532 composes a drive transmitting portion 5G of the embodiment. The drive transmitting portion 5G is arranged in the cylindrical space 551 of the first input gear 55 to transmit the rotation drive force from the first input gear 55 to the first transmission gear 53. The transmission projection portion 532 further has a contact side edge 532A (a contacting portion), a slope portion 532B and a facing side edge 532C.

The slope portion 532B is extended from the thin wall portion 53A so as to have a predetermined slope. The slope portion 532B is sloped along the rotation direction (refer to an arrow D101 in FIG. 10) of the first transmission gear 53 so as to come close to the first input gear 55's side. The contact side edge 532A is a side edge provided in a linked manner with an end at the first input gear 55's side of the slope portion 532B and extended along the axial direction of the rotation of the first transmission gear 53. The facing side edge 532C is a side edge extended in the axial direction at an opposite side to the contact side edge 532A. Incidentally, the facing side edge 532C is extended close to the thin wall portion 53A in the axial direction.

The facing projection portion 533 is arranged so as to face to the transmission projection portion 532 in a radial direction of the rotation of the first transmission gear 53. The facing projection portion 533 is a roughly rectangular projection piece projected in the axial direction from the thin wall portion 53A. The facing projection portion 533 is inserted into between the first supporting protrusion 551B and second supporting protrusion 551C of the first input gear 55 (refer to FIG. 7C).

The transmitting gear portion 531 is arranged so as to face to the pickup roller 51. The transmitting gear portion 531 has a structure that a plurality of gear teeth are arranged adjacent to each other in the peripheral direction. The plurality of gear teeth are arranged to be inclined at a predetermined angle to the axial direction of the rotation of the first transmission gear 53.

The pickup roller 51 further includes a roller input gear portion 511 (a roller gear portion) and a roller shaft portion 51B (a cylinder portion).

The roller input gear portion 511 is arranged so as to face to the first transmission gear 53. With reference to FIG. 7C, the roller input gear portion 511 is arranged at a side face of the pickup roller 51 so as to surround a proximal end of the roller shaft portion 51B. The roller input gear portion 511 is meshed with the transmitting gear portion 531 of the first transmission gear 53. Therefore, the roller input gear portion 511 also has a structure that a plurality of gear teeth are arranged adjacent to each other in the peripheral direction. The plurality of gear teeth are arranged to be inclined at a predetermined angle to the axial direction of the rotation of the pickup roller 51. The inclinations of the gear teeth of the roller input gear portion 511 and transmitting gear portion 531 are arranged in parallel. In other words, gear structure of the roller input gear portion 511 and transmitting gear portion 531 is ratchet gear mechanism. The ratchet gear mechanism couples and uncouples the drive transmission gear to the feeding roller.

The roller shaft portion 51B is formed in a cylinder like shape protruded in the axial direction from the inside of the roller input gear portion 511. The roller shaft portion 51B is protruded from the side face of the pickup roller 51 to the first input gear 55. Into the cylinder of the roller shaft portion 51B, the above-mentioned second drive shaft 59 is inserted. The roller shaft portion 51B penetrates the insertion space 534 of the first transmission gear 53 and is inserted into the cylindrical space 551 of the first input gear 55. The roller shaft portion 51B has a function supporting the first transmission gear 53 and first input gear 55 from the inside in the radial direction.

Figure 9:
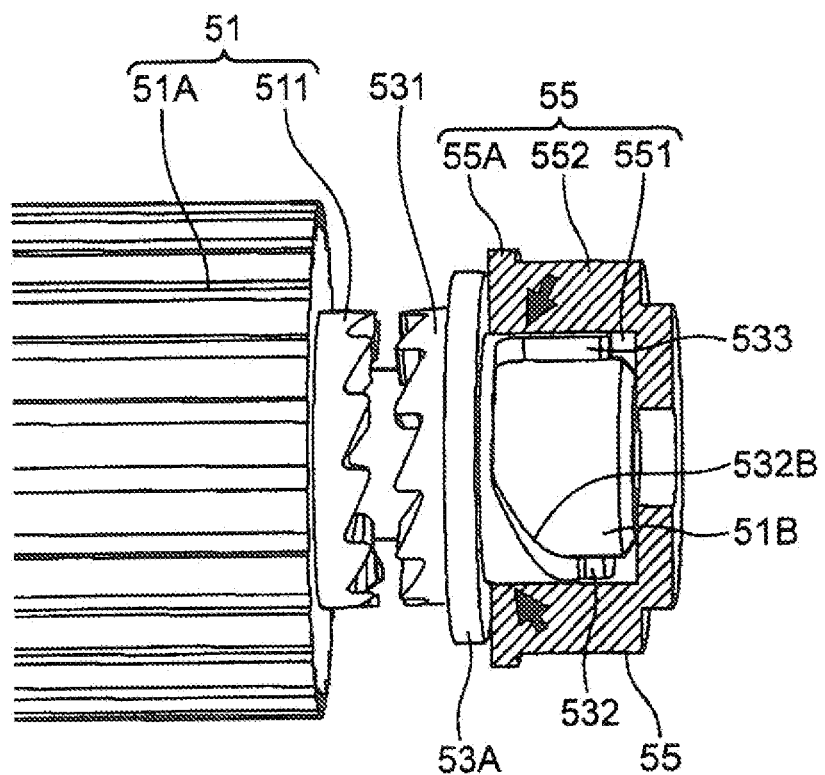
FIG. 9 is a sectional perspective view showing partially the pickup roller and drive transmission mechanism according to the embodiment of the present disclosure.

When the pickup roller 51, first transmission gear 53 and first input gear 55 are installed to the holder 50, the transmission projection portion 532 of the first transmission gear 53 is inserted into the cylindrical space 551 of the first input gear 55. Therefore, as shown in FIG. 8, the flange portion 55A of the first input gear 55 is arranged so as to face to the thin wall portion 53A of the first transmission gear 53. Moreover, the transmitting gear portion 531 of the first transmission gear 53 is arranged so as to face to the roller input gear portion 511 of the pickup roller 51. FIG. 9 is a sectional perspective view showing the inside of the first input gear 55 in a situation shown in FIG. 8. As shown in FIGS. 8 and 9, in the embodiment, the drive transmitting portion 5G is arranged in the cylindrical space 551 of the first input gear 55. Therefore, by utilizing the hollow cylindrical space 551 of the first input gear 55 having the cylindrical shape (refer to an area indicated by arrows in FIG. 8), the transmission of the rotation drive force from the first input gear 55 to the first transmission gear 53 is performed. As a result, a length in the axial direction of the drive transmission mechanism 5F transmitting the rotation drive force to the pickup roller 51 is decreased as much as possible. Therefore, it is possible to provide the image forming apparatus 1 and image reading device 4 including the drive transmission mechanism 5F minimized as much as possible.

Figure 10:
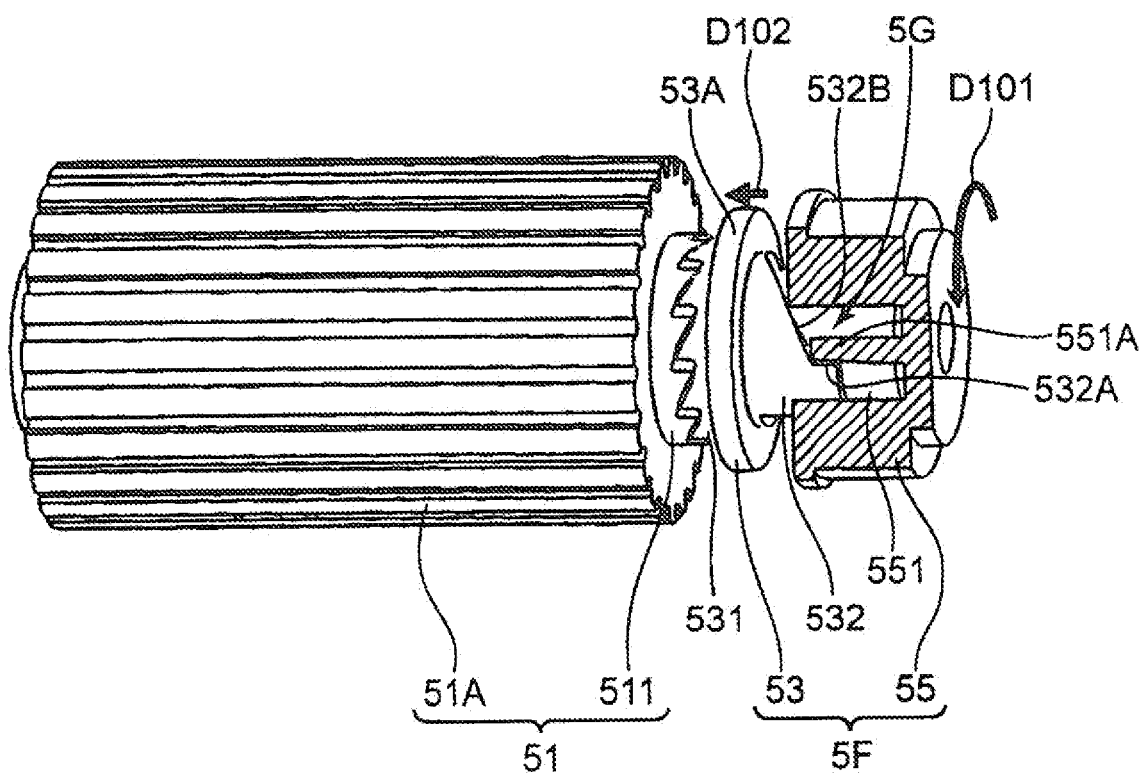
FIG. 10 is a sectional perspective view showing the pickup roller and drive transmission mechanism in a situation, in which a first transmission gear is positioned at a first position, according to the embodiment of the present disclosure.
Figure 11:
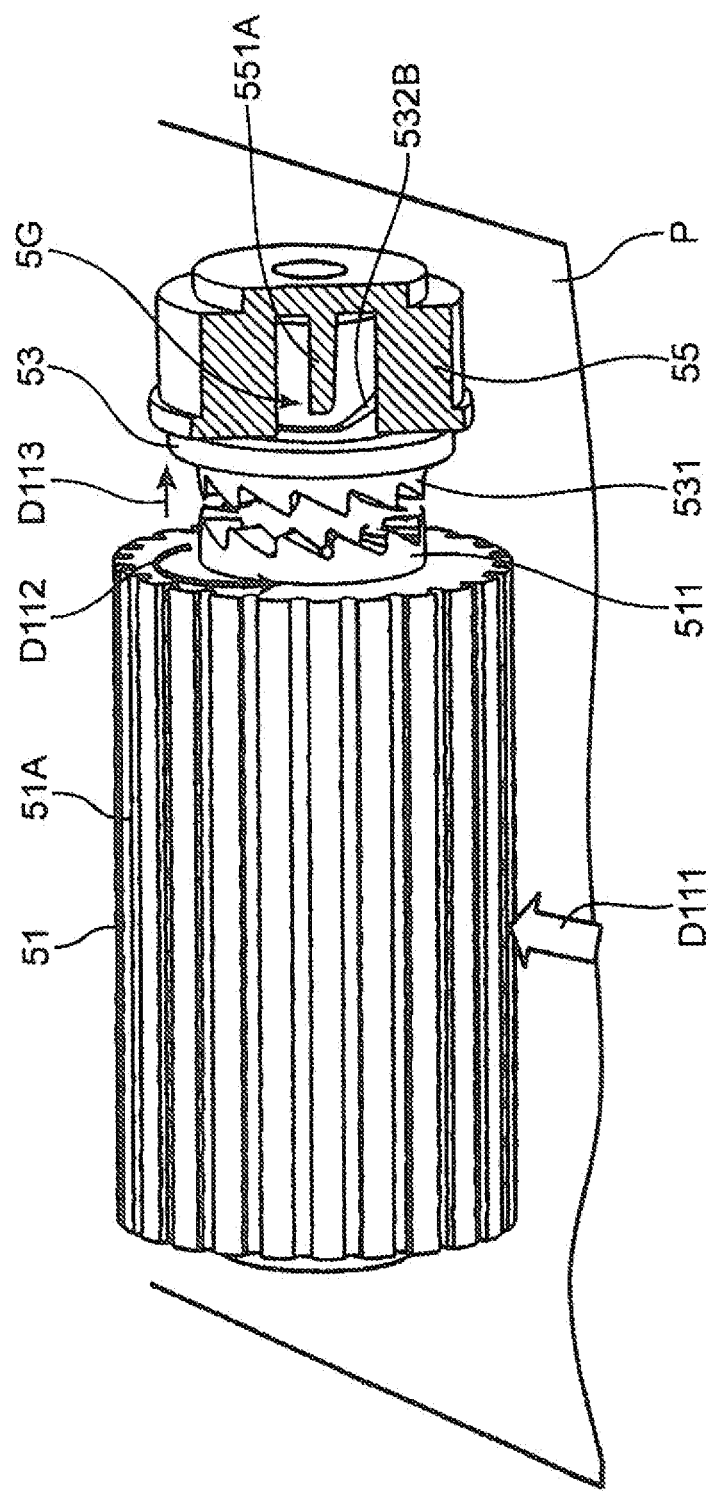
FIG. 11 is a sectional perspective view showing the pickup roller and drive transmission mechanism in another situation, in which the first transmission gear is positioned at a second position, according to the embodiment of the present disclosure.

Next, the operation of the drive transmission mechanism 5F transmitting the rotation drive force to the pickup roller 51 will be described. FIG. 10 a sectional perspective view showing the first transmission gear 53 in a state positioned at the first position in the axial direction and the pickup roller 51 in a situation where the rotation drive force is transmitted from the first input gear 55 via the first transmission gear 53. FIG. 11 a sectional perspective view showing the first transmission gear 53 in another state positioned at the second position and the pickup roller 51 in another situation where the transmission of the rotation drive force from the first transmission gear 53 is cut off.

As mentioned above, the rotation drive force generated by the motor 500 is inputted to the first input gear 55 via the idle gears 57. As a result, the first input gear 55 becomes a first state that rotation speed of the first input gear 55 is higher than rotation speed of the first transmission gear 53 still stopping the rotation. At this time, the engaging protrusion 551A is engaged with the transmission projection portion 532 and the rotation drive force of the first input gear 55 is transmitted to the first transmission gear 53. Further, in accordance with the rotation of the first input gear 55, the first transmission gear 53 is slide-moved from the second position to the first position. In detail, by the rotation (refer to the arrow D101 in FIG. 10) of the first input gear 55, first, the engaging protrusion 551A comes into contact with the slope portion 532B and the first transmission gear 53 is pressured to the pickup roller 51's side (refer to an arrow D102 in FIG. 10). As a result, the first transmission gear 53 is slide-moved from the second position (refer to FIG. 11) to the first position (refer to FIG. 10). Moreover, when the first input gear 55 is rotated, the engaging protrusion 551A reaches an end at a downstream side in the rotation direction of the slope portion 532B and comes into contact with the contact side edge 532A. As a result, the first input gear 55 and first transmission gear 53 become capable of integrally rotating and the rotation drive force is transmitted from the first input gear 55 to the first transmission gear 53.

Furthermore, with reference to FIG. 10, when the first transmission gear 53 is moved from the second position to the first position, the transmitting gear portion 531 is meshed with the roller input gear portion 511 and the rotation drive force is transmitted to the pickup roller 51. As a result, the rotation drive force is transmitted from the first input gear 55 to the pickup roller 51 via the first transmission gear 53 and the document sheet P is conveyed in the conveying direction by the rotation of the pickup roller 51 (refer to the arrow D101 in FIG. 10).

When the document sheet P is conveyed in the sheet conveying path 300 (refer to FIG. 4) by the pickup roller 51 and document sheet feeding roller 52 (refer to FIG. 5), the leading end of the document sheet P reaches a pair of conveying rollers (not shown) arranged at a downstream side from the document sheet feeding roller 52. The pair of the conveying rollers are rotated by another drive mechanism different from the pickup roller 51 and document sheet feeding roller 52 to convey the document sheet P. When the leading end of the document sheet P reaches the pair of the conveying rollers, the transmission of the rotation drive force from the motor 500 to the pickup roller 51 and document sheet feeding roller 52 is cut off by a controlling portion (not shown). As a result, in the drive transmission mechanism 5F transmitting the drive to the pickup roller 51, the rotation drive force inputted from the first input gear 55 to the first transmission gear 53 is cut off. Incidentally, the cutoff of the transmission of the rotation drive force of the motor 500 may be a stop of the rotation of the motor 500 or may be a switching operation of ON/OFF of a clutch mechanism (not shown). As a result, the pickup roller 51 and document sheet feeding roller 52 become capable of freely rotatable. The freely rotatable pickup roller 51 and document sheet feeding roller 52 are co-rotated with the document sheet P conveyed by the pair of the conveying rollers. At this time, the document sheet feeding roller 52 becomes freely rotatable in a direction of the co-rotating by an action of the one-way clutch 54. On the other hand, the rotation face 51A of the pickup roller 51 becomes a state pulled by the document sheet P (refer to arrows D111 and D112 in FIG. 11). The pickup roller 51 becomes a second state that rotation speed of the pickup roller 51 is higher than rotation speed of the first transmission gear 53 when drive transmission is cut off. As a result, slope portions of the gear teeth of the roller input gear portion 511 make the transmitting gear portion 531 pressured to the first input gear 55's side and the first transmission gear 53 is slide-moved (refer to an arrow D113 in FIG. 11) from the first position to the second position (refer to FIG. 11). That is, the pickup roller 51 is rotated in relative to the first transmission gear 53 in an opposite direction to a meshing direction of the ratchet gear structure. In addition, a transmission mechanism of the rotation drive force from the first transmission gear 53 to the pickup roller 51 becomes a cutoff state. As a result, the connection of the pickup roller 51 and first transmission gear 53 is released and the pickup roller 51 becomes co-rotatable with the document sheet P. At this time, as shown in FIG. 11, the engaging protrusion 551A and slope portion 532B are arranged at an interval in the peripheral direction. Subsequently, a rear end of the document sheet P is released from the pickup roller 51, and then, the rotation drive force of the motor 500 is generated by the controlling portion (not shown) again. After that, when the rotation drive force is transmitted from the first input gear 55 to the pickup roller 51 via the first transmission gear 53, the engaging protrusion 551A comes into contact with the slope portion 532B and contact side edge 532A (refer to FIG. 10) in order. Thus, the ratchet gear mechanism couples the drive transmission gear to the feeding roller in a first rotation direction to feed the sheet by the feeding roller, and uncouples the drive transmission gear to the feeding roller by moving the drive transmission gear to the second position in a second rotation direction opposite to the first rotation direction.

In the embodiment, as shown in FIG. 9, the roller shaft portion 51B of the pickup roller 51 is inserted into the cylindrical space 551 at the inside in the radial direction of the transmission projection portion 532 and facing projection portion 533. In the first input gear 55, the first supporting protrusion 551B and second supporting protrusion 551C are arranged at an interval in the peripheral direction from the engaging protrusion 551A (refer to FIGS. 7A and 7D). In addition, the roller shaft portion 51B comes into contact with the engaging protrusion 551A, first supporting protrusion 551B and second supporting protrusion 551C from the inside in the radial direction to pivotally support the first input gear 55. Thus, the first input gear 55 is supported at many positions in the peripheral direction by the roller shaft portion 51B, thereby restraining the first input gear 55 from being inclined with respect to the axial direction. Therefore, it is possible to suppress that the transmission projection portion 532 inserted into the cylindrical space 551 is strongly pressured to the inside in the radial direction by the inner peripheral surface of the first input gear 55. As a result, it is possible to preferably suppress disturbance of the slide-movement in the axial direction of the first transmission gear 53. By contrast, if the only engaging protrusion 551A were protruded on the inner peripheral surface of the first input gear 55, although the rotation drive force may be transmitted from the engaging protrusion 551A to the transmission projection portion 532, one or more gaps in the peripheral direction formed between the first input gear 55 and roller shaft portion 51B become wider. In such a case, the first input gear 55 may be easily inclined with respect to the axial direction. However, in the embodiment, by arranging the first supporting protrusion 551B and second supporting protrusion 551C in addition to the engaging protrusion 551A, it is possible to restrain the inclination of the first input gear 55 and to securely actualize the transmission of the rotation drive force. At this time, by arranging a plurality of protrusions, such as the first supporting protrusion 551B and second supporting protrusion 551C, it is possible to securely restrain the first input gear 55 from being inclined with respect to the axial direction. Furthermore, by arranging the facing projection portion 533 so as to face to the transmission projection portion 532 of the first transmission gear 53, since the first transmission gear 53 buries the gaps between the roller shaft portion 51B and first input gear 55 at a plurality of positions in the peripheral direction (refer to an arrow in FIG. 9), it is possible to more restrain the inclination of the first input gear 55.

Moreover, as mentioned above, in the embodiment, the roller shaft portion 51B supporting the first input gear 55 and first transmission gear 53 from the inside in the radial direction is arranged by using partially the pickup roller 51. Further, by utilizing the inside of the cylinder (the insertion space 534) of the first transmission gear 53, it is possible to extend the roller shaft portion 51B to the cylindrical space 551 of the first input gear 55. As a result, the first input gear 55, first transmission gear 53 and pickup roller 51 become capable of securely rotating around the second drive shaft 59.

Although the automatic document feeding device 3, and the image reading device 4 and image forming apparatus 1 including this automatic document feeding device 3 in accordance with of the present disclosure were described above, the present disclosure is not restricted by these. For example, the present disclosure may be applied to the improved embodiment as mentioned below.

Although, in the above-described embodiment, a configuration that the drive transmission mechanism 5F transmits the rotation drive force to the pickup roller 51 was described, the present disclosure is not restricted by this configuration. In another embodiment, the drive transmission mechanism 5F may be configured to transmit the rotation drive force to the document sheet feeding roller 52 and other conveying rollers. In addition, the drive transmission mechanism 5F is not restricted by that applied to the automatic document feeding device 3. In another embodiment, the drive transmission mechanism 5F may be configured to transmit the rotation drive force to the pickup roller 112 and first sheet feeding roller 113 conveying the sheet S in the cartridge 110.

Although, in the above-described embodiment, a configuration that the roller shaft portion 51B is protruded from the pickup roller 51 to the first input gear 55 was described, the present disclosure is not restricted by this configuration. In another embodiment, a cylinder portion formed in similar to the roller shaft portion 51B may be protruded from the rear plate 502 to the first input gear 55 and inserted into the cylindrical space 551.

While the present disclosure has been described with reference to the particular illustrative embodiments, it is not to be restricted by the embodiments. It is to be appreciated that those skilled in the art can change or modify the embodiments without departing from the scope and spirit of the present disclosure.

What is claimed is:

1. A sheet feeding device, comprising:
a tray portion on which a sheet is placed;
a sheet conveying path extending from the tray portion to convey the sheet in a predetermined conveying direction;
a feeding roller driving and rotating to feed the sheet in the conveying direction;
a driving portion generating rotation drive force used for driving and rotating the feeding roller; and
a drive transmission mechanism transmitting the rotation drive force to the feeding roller,
wherein the drive transmission mechanism includes:
a rotation axis supporting the feeding roller rotatably;
a drive input gear formed in a cylinder like shape having an inner space and arranged on the rotation axis so as to rotate around the rotation axis by input of the rotation drive force of the driving portion; and
a drive transmission gear arranged between the feeding roller and drive input gear on the rotation axis so as to rotate around the rotation axis and to become capable of slide-moving in an axial direction of the rotation axis between a first position where the rotation drive force is transmitted to the feeding roller and a second position where the transmission of the rotation drive force to the feeding roller is cut off by transmission of the rotation drive force from the drive input gear, and then, to transmit the rotation drive force to the feeding roller,
the drive input gear includes a first engaging portion in the inner space,
the drive transmission gear includes a second engaging portion connectable to the first engaging portion,
the second engaging portion is inserted into the inner space at the second position,
the sheet feeding device further comprises:
a ratchet gear mechanism coupling and uncoupling the drive transmission gear to the feeding roller,
wherein the ratchet gear mechanism couples the drive transmission gear to the feeding roller in a first rotation direction to feed the sheet by the feeding roller, and uncouples the drive transmission gear to the feeding roller by moving the drive transmission gear to the second position in a second rotation direction opposite to the first rotation direction,
the second engaging portion has a slope portion sloped along a rotation direction of the drive transmission gear so as to come close to the side of the drive input gear, and a contacting portion provided in a linked manner with an end at the side of the drive input gear of the slope portion and extended along the axial direction,
in the second position, when the drive input gear is rotated, the first engaging portion is moved along the slope portion and the drive transmission gear is pressured to a side of the feeding roller, the drive transmission gear is slide-moved from the second position to the first position,
in the first position, when the first engaging portion comes into contact with the contacting portion, the rotation drive force is transmitted from the drive input gear to the drive transmission gear,
the sheet feeding device further comprises:
a protruded portion arranged at an interval from the first engaging portion in a peripheral direction in rotation of the drive input gear and protruded inwardly in the radial direction from an inner peripheral surface in the drive input gear; and
a cylinder portion arranged to penetrate an insertion space formed in the drive transmission gear, inserted into the inner space together with the second engaging portion to come into direct contact with the first engaging portion and protruded portion from the inside in the radial direction and to pivotally support the drive input gear.

2. The sheet feeding device according to claim 1, wherein a plurality of the protruded portions are arranged at intervals in the peripheral direction.

3. The sheet feeding device according to claim 1, wherein the drive transmission gear has a insertion space into which the cylinder portion is inserted,
the cylinder portion is protruded from a side face of the feeding roller to the drive input gear, penetrates the insertion space and is inserted into the inner space.

4. The sheet feeding device according to claim 1, wherein the drive transmission gear includes a transmitting gear portion arranged so as to face to the feeding roller,
the feeding roller including a roller gear portion meshed with the transmitting gear portion,
the ratchet gear structure is composed of the transmitting gear portion and roller gear portion,
when the drive input gear is rotated by the rotation drive force, the first engaging portion is guided to the slope portion of the second engaging portion and, when the drive transmission gear is moved from the second position to the first position, the drive transmission gear is meshed with the roller gear portion and the rotation drive force is transmitted to the feeding roller,
in a state that the drive rotation force is released, when rotation force in a predetermined direction from the outside is applied to the feeding roller, the drive transmission gear is slide-moved from the first position to the second position, the connection of the ratchet gear structure is released.

5. An image reading device comprising:
the sheet feeding device according to claim 1, the sheet feeding device conveying the sheet as a document; and
a reading portion arranged so as to face to the sheet conveying path to read an image of the document.

6. An image forming apparatus comprising:
the sheet feeding device according to claim 1; and
an image forming portion forming an image on the sheet.

* * * * *